(12) United States Patent
Offer et al.

(10) Patent No.: US 6,605,794 B1
(45) Date of Patent: Aug. 12, 2003

(54) METHODS FOR RESISTANCE CLADDING AND WELDING ON HOT CRACK SUSCEPTIBLE MATERIALS

(75) Inventors: Henry Peter Offer, Santa Cruz, CA (US); Eric Russel Willis, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/232,653

(22) Filed: Sep. 3, 2002

(51) Int. Cl.[7] ............................................. B23K 11/00
(52) U.S. Cl. .................. 219/76.17; 219/78.01; 219/78.02
(58) Field of Search ...................... 219/76.17, 78.01, 219/78.02; 148/524, 525, 526, 527

(56) References Cited

U.S. PATENT DOCUMENTS

| | | | | |
|---|---|---|---|---|
| 5,705,786 A | * | 1/1998 | Solomon et al. | 219/121.46 |
| 5,710,405 A | * | 1/1998 | Solomon et al. | 219/121.46 |
| 6,364,971 B1 | * | 4/2002 | Peterson et al. | 148/525 |
| 6,384,365 B1 | * | 5/2002 | Seth et al. | 219/76.13 |

* cited by examiner

Primary Examiner—M. Alexandra Elve
(74) Attorney, Agent, or Firm—Nixon & Vanderhye

(57) ABSTRACT

Electrical resistance welding with low heat input in conjunction with applied forces effecting compressive forces in the weld are utilized to weld materials sensitive to hot cracking. An electrode coupled with a force applicator performs a low heat input resistance-type weld with triaxial compressive forces introduced in the weld to prevent or inhibit the formation of tensile induced cracks in the weld. This enables subsequent fusion welding overlying the initial weld without risk of hot cracking in the final weld.

9 Claims, 3 Drawing Sheets

METHODS FOR RESISTANCE CLADDING AND WELDING ON HOT CRACK SUSCEPTIBLE MATERIALS

BACKGROUND OF THE INVENTION

The present invention relates generally to welding and particularly relates to welding on stress-crack sensitive materials in a manner enabling subsequent conventional fusion welding without the risk of helium-induced or other types of hot cracking in the fusion weld area.

There are various types of conventional fusion welding processes, such as electric arc, laser beam, or electron beam welding. In those processes, a molten pool of hot metal is formed, either by melting a substrate or adding a filler metal, or both. Materials, however, are oftentimes sensitive to hot cracking. Hot cracking of the welded surface is typically caused by strains and stresses due to contraction on cooling, i.e., during the phase change from liquid hot metal to a solid state. An extreme but actual example of hot cracking sensitive materials is fusion welding on material containing higher levels of helium, such as in permanent portions of older nuclear reactor vessel internals near the fuel core. In neutron irradiated austenitic stainless steels with significant boron content (which is susceptible to transmutation to helium), the helium in the weld materials causes several adverse effects through changes in mechanical properties. For example, when high helium content materials are exposed to the heat of a welding cycle, the high temperature allows the helium to diffuse rapidly to grain boundaries which form voids which, in turn, weaken the material resulting in hot cracking. Even for known low heat input fusion welding processes, the capability to reliably weld without hot cracking is limited to materials having relatively low helium levels. Hot cracking is also not limited to materials having a helium content but constitutes only one type of material in which hot cracking occurs. The hot cracking problem is also compounded by the typically high tensile temporal and residual surface stresses caused by the fusion processes. This adverse stress situation in the as-welded condition is characteristic of all conventional fusion welding processes and applications, especially for the heavy section thicknesses of materials generally found in permanent nuclear vessel internals and for the vessel wall itself or its attachments. It is effectively impossible to provide sufficiently low heat in the fusion welding process to avoid hot cracking, while still having a viable fusion welding process.

In addition to the hot cracking problem during cooling of the weld pool, stress corrosion cracking (SCC) can occur in materials susceptible to thermal or neutron sensitization when used in aggressive environments such as oxygen or halogen containing high temperature nuclear reactor water or moderator. This type of environmentally induced cracking occurs when the level of surface residual stress becomes sufficiently tensile as is typically the case for conventional fusion welding practice.

BRIEF DESCRIPTION OF THE INVENTION

In accordance with a preferred embodiment of the present invention, there is provided a low-cost reliable method for making full strength structural welds on materials which are susceptible to hot cracking enabling subsequent conventionally applied fusion welding processes. For example, highly neutron irradiated substrate materials as in a nuclear reactor vessel can be subsequently fusion welded without risk of helium-induced or other types of hot cracking in the fusion weld area. Particularly, a non-fusion electrical resistance or solid state weld process with very low local heat input is employed in conjunction with application of localized forces to the weld compressively stressing the weld in a crack-susceptible or sensitive substrate during both the welding and cooling stages. Additionally, by using a highly conductive electrode as a heat sinking source, the present process simultaneously affords residual compressive stresses in the cladding or substrate to mitigate subsequent environmentally induced failures such as stress corrosion cracking. The cladding may be a separate sheet of material overlying the substrate or can be formed by fusing the surface of the substrate where the cladding is a sheet metal overlay. The electrical resistance welding can be performed about the margins of the overlay or throughout portions or all of the sheet metal overlay and substrate, thus protecting the underlying substrate from exposure to the external environment. For example, the sheet metal overlay may seal the underlying substrate from an aggressive water environment in a nuclear reactor vessel minimizing or eliminating problems associated with stress corrosion cracking of the underlying substrate.

It will be appreciated that portions of the weld which attach to the substrate are the most susceptible to hot cracking, particularly in materials containing substantial quantities of helium, in the event fusion welds are performed in that region. By employing electrical resistance heating at low heat input to the extent that a substantial portion or all of the materials joined remain below the liquidus temperature, the heat does not penetrate sufficiently for the helium to defuse and affect grain boundaries which cause hot cracking. That is, the electrical resistance weld of the preferred embodiment hereof provides insufficient heat in a temperature regime which can lead to hot cracking as a result of tensile stresses occurring during and after welding. Additionally, compressive forces are applied during the welding process at low temperature to provide triaxial compressive stresses in the weld which are gradually relieved and prevent thermal shrinkage due to induced tensile stresses (hot cracking).

Particularly, in the preferred embodiment of the present invention an electrode is applied to a weld surface, e.g. a thin sheet material overlying a substrate and heat and compression forces are applied to the weld. Because of the relatively small size of the plastic weld nugget during application of heat from the electrode, the compressive surface stress at the electrode contact area leads to triaxial compressive stresses in the contained portions of the weld nugget. The electrode also serves as a heat sink for the weld such that welding is performed for a predetermined time and over a temperature and force regime to substantially preclude hot cracking in the weld.

In a preferred embodiment according to the present invention, there is provided a method of welding on a substrate susceptible to hot cracking comprising the steps of (a) applying a non-fusion electrical resistance weld to the substrate susceptible to hot cracking, (b) while performing step (a), applying a localized force to compressively stress the weld and (c) performing steps (a) and (b) for a predetermined time and over a temperature and force regime to substantively preclude subsequent hot cracking in the weld.

In a further preferred embodiment according to the present invention, there is provided a method of welding on a substrate susceptible to hot cracking comprising the steps of (a) applying a low heat input solid state weld to the substrate susceptible to hot cracking, (b) while performing step (a), applying a localized force to the weld compressively stressing the weld and (c) performing steps (a) and (c) for a predetermined time and over a temperature and force regime to substantially preclude subsequent hot cracking in the weld.

DETAILED DESCRIPTION OF THE INVENTION

Figures 1, 2, 3, 4:
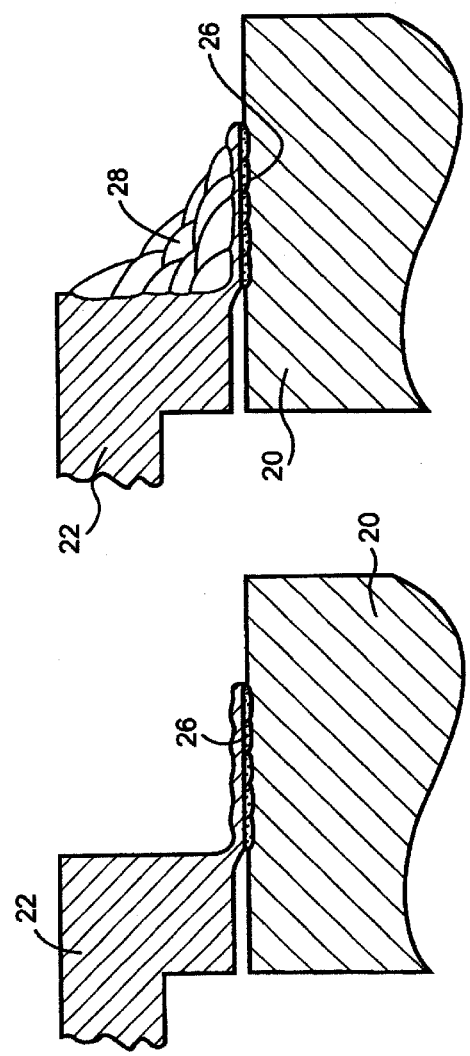
FIG. 1 is a fragmentary cross-sectional view of a sheet metal material and a substrate with a conventional fusion weld between the two surfaces.
FIGS. 2 and 3 are cross-sectional views of sheet metal material overlying a substrate and welded to one another using electrical resistance welding in conjunction with compressive forces applied to the weld area.
FIG. 4 is a view similar to FIGS. 2 and 3 illustrating a conventional fusion weld applied to the initial weld forming a composite weld.

Referring now to the drawings, particularly to FIG. 1, there is illustrated a substrate 10 and adjoining material 12, for example, a sheet of metal material, joined to one another by a conventional fusion welding process. It will be appreciated that conventional fusing welding involves the application of substantial heat to the joined surfaces with substantial risk of hot cracking of the surfaces. Even for known low heat input fusion welding processes, the capability to reliably weld without hot cracking is limited to materials having relatively low helium levels. The hot cracking problem is also compounded by the typical high tensile residual surface stresses caused by the fusion process. In FIG. 1, areas of thermal damage in the weld are designated 14 and would constitute areas highly susceptible to hot cracking. In those materials having a significant helium content, the risk of hot cracking even with using low heat input fusion welding processes remains substantial.

Referring to FIGS. 2 and 3 there is illustrated a weld performed by a method according to the present invention which minimizes or eliminates cracking on hot-crack sensitive materials especially those with increased helium content. As illustrated in FIG. 2, a substrate 20 and material 22, for example a sheet of metal material 22, are overlaid relative to one another with a flange 24 of the sheet material 22 overlaying the substrate 20. It will be appreciated that while the illustrated invention involves joining sheet material and a substrate, the invention is also applicable to a substrate wherein the weld is performed on an exposed surface of the substrate without joining it to another material. That is, the surface of the substrate forms the weld. Particularly, the adjoining surfaces of the flange 24 and substrate 20 are welded to one another utilizing a low heat input electrical resistance weld. The weld is formed by applying an electrode to the outer surface of the flange 24 with a force being applied in a direction tending to join the flange 24 and substrate 20 to one another. Thus the interface between the sheet material 22, particularly the flange 24 and the substrate 20 is electrically resistance heated in conjunction with the application of a compressive force in a direction tending to force the surfaces together. Generally, therefore, the electrode is applied to the sheet material under a compressive force.

Various forms of electrical power may be applied via the electrode. For example, low voltage capacity discharge, alternating or direct current or high frequency resistance types of electrical power can be applied to the electrode. Also, various force generators may be utilized to provide the compressive forces on the weld. For example, mechanical springs, hydraulic or pneumatic cylinders, or electromagnetic solenoids and electromechanical drives can be applied to the electrode, to generate triaxial stresses in the joined portions of the sheet material and substrate in the area of the heat applied by the electrode. Thus the weld has compressive forces in an X, Y plane as well as in a direction generally normal to the X, Y plane. As the weld cools, the compressive forces are relieved to some extent, but remain sufficient to substantially eliminate tensile induced cracking during cooling.

Figure 5:
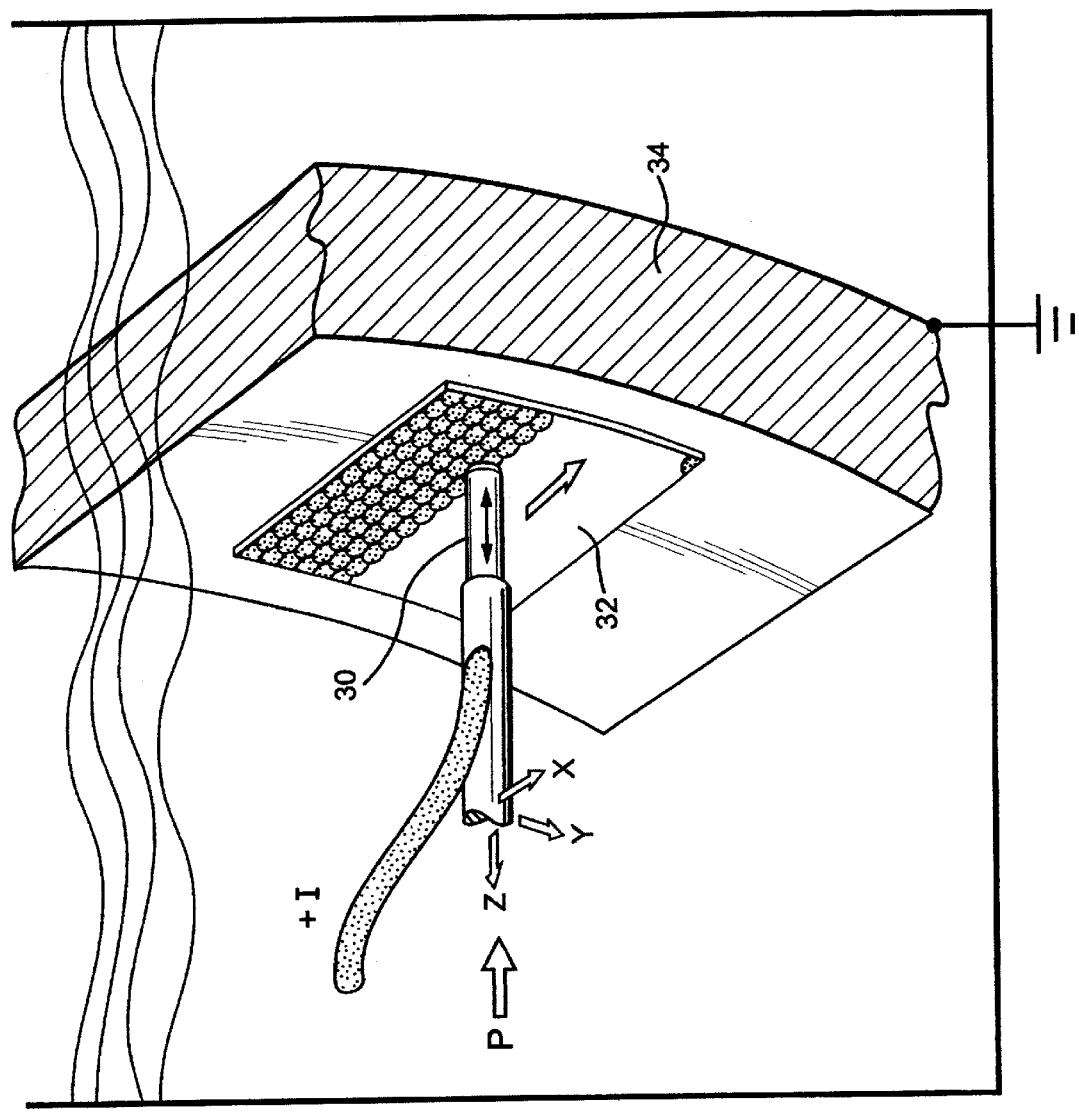
FIG. 5 is a schematic representation of an electrode used in the electrical resistance weld, with compressive forces applied to the weld by the electrode.
Figure 6:
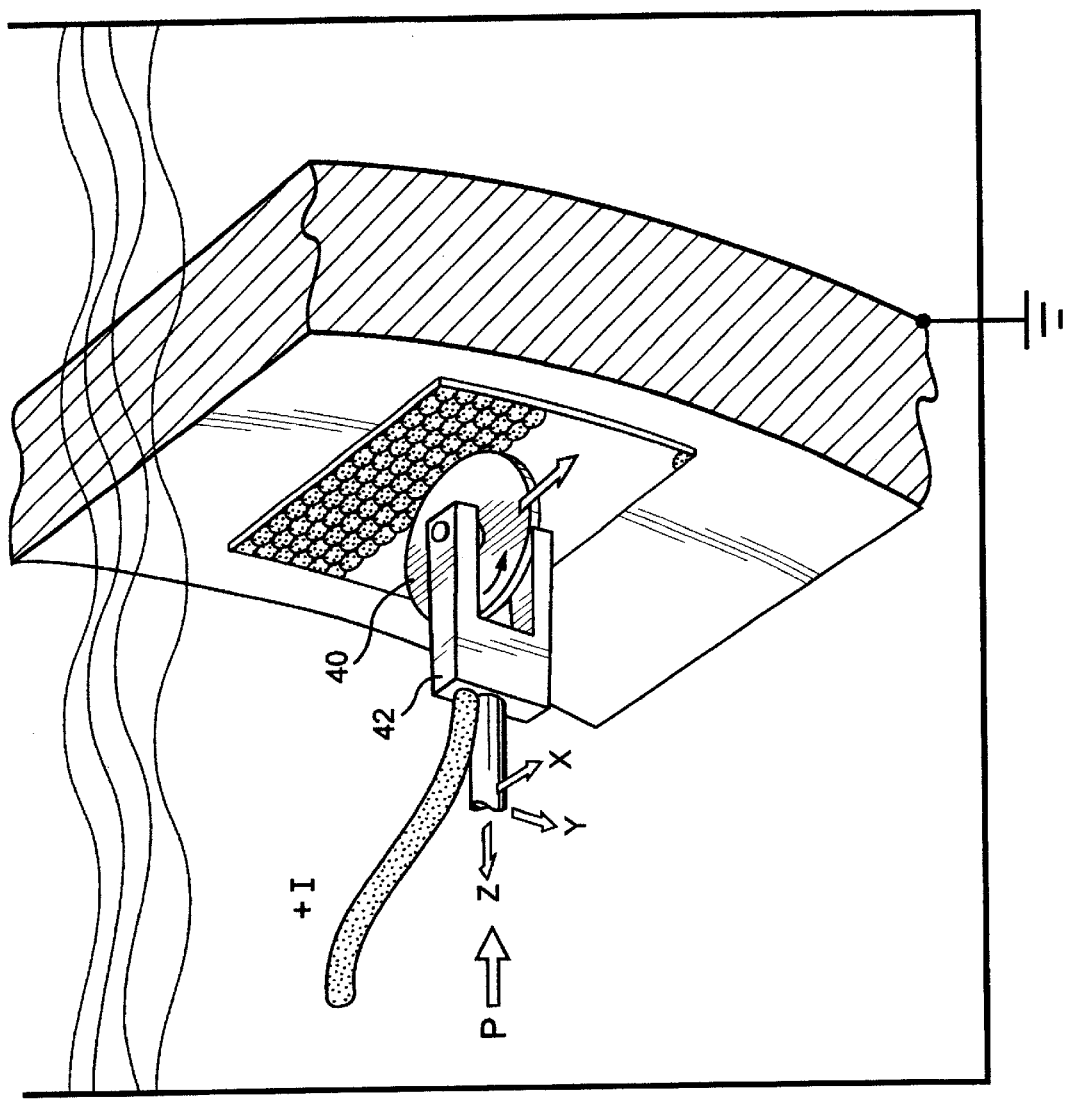
FIG. 6 is a view similar to FIG. 5 illustrating a resistance welding disk-type electrode.

It will be appreciated that the compressive force and the current from the electrode are concurrently applied using a contact surface on a movable electrode such as the edge of a rotating conductive circular wheel or the end of a rod (FIGS. 5 & 6 respectively). The movement of the electrode over the weld surface may be continuous or pulsed at predetermined intervals. Similarly, the current applied to the electrode may be pulsed. The current to and travel of the electrode may be coordinated to control the local temperature rise at the weld. As illustrated in FIG. 4, and subsequent to the electrical resistance weld 26, the juncture of the sheet material 22 and substrate 20 may be further welded by conventional fusion welding without substantial risk of hot cracking. This fusion weld is indicated 28. Thus, the initial electrical resistance weld is performed for a time and in a temperature enforced regime which substantially precludes subsequent hot cracking in the weld not withstanding an overlay of additional weld material applied by conventional fusion welding. A substantial benefit of the second fusion weld is that the risks of hot cracking during the fusion welding process are virtually eliminated.

Referring to FIG. 5, electrode 30 is illustrated in a position using the electrical resistance welding technique to weld a sheet material 32 to an underlying substrate 34. The electrode 30 is coupled to a force applying device, schematically illustrated at P. Compressive forces are applied at the interface of the sheet metal 32 and substrate 34 in the area of the weld. The low heat input from the electrode 30 and the triaxial compressive forces are provided by periodically impacting the electrode 30 along the weld and additionally by providing a highly heat conductive electrode 30 which serves as an effective heat sink. The heat to the weld is thus maintained at a relatively low level while the triaxial compressive forces in the weld materially reduce the tendency for hot cracking particularly in those materials having a substantial helium content.

Referring now to FIG. 6, the electrode comprises a roller disk 40 mounted for rotation on a fixture 22. The fixture 22 is coupled to a force applicator P for applying compressive forces to the weld during the foregoing described welding process. The final composite weld affords substantial resistance to hot cracking due to the application of the initial resistance welding followed by the subsequent fusion welding. As illustrated in FIGS. 5 and 6, the welding process hereof may be accomplished in either a dry or wet environment, e.g., under water. For example, in a nuclear reactor, it will be appreciated that a number of sheets may be sequentially welded one overlying the other to a predetermined thickness to minimize the individual sheet thickness and minimize the heat input to the corresponding weld nuggets particularly at the substrate interface. Alternatively, a composite sheet material having selected property variations throughout its thickness may be utilized to minimize the potential for hot cracking. By using multiple layers of thin sheet material, the heat input may be minimized, thus lowering the risk of hot cracking. It will also be appreciated that catalytic enhancing corrosion resistant or carbide stabilizing alloying elements such as palladium, chromium or niobium may be used to enhance surface performance especially stress corrosion cracking resistance. While the drawing FIGS. 5 and 6 illustrate the initial weld applied throughout the entire area of the sheet material overlying the substrate, the perimeter or margin of the sheet material may be initially welded using the electrical resistance welding technique of the present invention to hermetically seal the underlying central area of the substrate from its environment while simultaneously providing sufficient structural margins in the welded area. Traditional heat sinking can be provided. For example, the sheet material may be restrained on the substrate by clamps which control or minimize the rise in temperature during welding. Electrodes may also be used. The electrode per se may carry insulators and conductors in contact with the sheet material to provide more uniform compressive stresses and strains across the heated surface.

In summary the rapid low heat input solid state welding in a crack sensitive substrate in conjunction with applied compressive forces, substantially reduces or precludes the formation of hot cracks. By solid state welding is meant that a substantial portion or all of the thickness of the material joined remains below the liquidus temperature and that melting, if any, is confined to the contact region under the electrode.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding on a substrate susceptible to hot cracking comprising the steps of:
   (a) applying a non-fusion electrical resistance weld to the substrate susceptible to hot cracking;
   (b) while performing step (a), applying a localized force to compressively stress the weld; and
   (c) performing steps (a) and (b) for a predetermined time and over a temperature and force regime to substantively preclude subsequent hot cracking in the weld.

2. A method according to claim 1, including while performing step (b), simultaneously plastically straining and cooling the weld from an external source.

3. A method according to claim 1, wherein step (a) is performed with a heat input to the weld at a sufficiently low temperature such that the weld remains below a liquidus temperature of the substrate.

4. A method according to claim 1, including welding a sheet material to the substrate and performing step (a) with a heat input to the sheet material and substrate such that a substantial portion or all of the sheet material and substrate at the weld remain below the liquidus temperature of the sheet material and substrate.

5. A method according to claim 4 wherein step (a) is performed by applying an electrode to the sheet material and confining any melting of the sheet material or substrate to a contact region between the sheet material and the electrode.

6. A method according to claim 4, including performing steps (a)–(c) about peripheral margins of the sheet material to structurally secure the sheet material to the substrate and seal areas of the substrate within the margins from external exposure to the environment.

7. A method according to claim 4 including performing steps (a)–(c) throughout substantially the entire area of the sheet material overlying the substrate.

8. A method according to claim 1, including subsequent to steps (a)–(c), applying a fusion weld to the first mentioned weld whereby the first weld inhibits subsequent hot cracking of the substrate as a result of fusion welding.

9. A method of welding on a substrate susceptible to hot cracking comprising the steps of:
   (a) applying a low heat input solid state weld to the substrate susceptible to hot cracking;
   (b) while performing step (a), applying a localized force to the weld compressively stressing the weld and;
   (c) performing steps (a) and (b) for a predetermined time and over a temperature and force regime to substantially preclude subsequent hot cracking in the weld.

* * * * *